(12) United States Patent
Bonneau, Jr. et al.

(10) Patent No.: US 8,931,690 B2
(45) Date of Patent: Jan. 13, 2015

(54) PROXIMITY STANDOFF DETECTION COUPLING DEVICE (PSDCD)

(71) Applicant: Cubic Corporation, San Diego, CA (US)

(72) Inventors: Walt C. Bonneau, Jr., Escondido, CA (US); Jon D. Macklin, El Cajon, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/217,865

(22) Filed: Mar. 18, 2014

(65) Prior Publication Data

US 2014/0284378 A1 Sep. 25, 2014

Related U.S. Application Data

(60) Provisional application No. 61/803,382, filed on Mar. 19, 2013.

(51) Int. Cl.
*G06F 17/00* (2006.01)
*G06K 7/10* (2006.01)
*G06K 15/00* (2006.01)
*G06K 19/06* (2006.01)
*G08B 13/14* (2006.01)

(52) U.S. Cl.
CPC ........ *G06K 7/10118* (2013.01); *G06K 7/10366* (2013.01)
USPC . 235/375; 235/487; 235/462.01; 235/462.13; 235/492; 235/493; 340/572.1

(58) Field of Classification Search
USPC .............. 235/487, 462.01, 454, 462.13, 492, 235/493; 340/572.1
See application file for complete search history.

(56) References Cited

U.S. PATENT DOCUMENTS

| | | | | |
|---|---|---|---|---|
| 6,009,400 A * | 12/1999 | Blackman | ...................... | 705/303 |
| 2006/0001585 A1* | 1/2006 | Saito et al. | .................... | 343/754 |
| 2008/0121710 A1* | 5/2008 | Haddock | ....................... | 235/454 |
| 2008/0266183 A1* | 10/2008 | Takei | ..................... | 343/700 MS |
| 2009/0218401 A1* | 9/2009 | Moran et al. | ................... | 235/439 |
| 2009/0261167 A1* | 10/2009 | Iwayama | ...................... | 235/454 |
| 2009/0322477 A1* | 12/2009 | Celorio | ........................ | 340/5.82 |
| 2012/0048934 A1* | 3/2012 | Iwayama | ...................... | 235/440 |
| 2012/0193422 A1* | 8/2012 | Franz | ......................... | 235/462.1 |
| 2013/0278425 A1* | 10/2013 | Cunningham et al. | ..... | 340/572.1 |

* cited by examiner

*Primary Examiner* — Daniel Walsh
(74) *Attorney, Agent, or Firm* — Kilpatrick Townsend & Stockton LLP

(57) ABSTRACT

Systems, methods, and devices for detection of a substance on the surface of an object are disclosed. An RFID receiver can communicate with an RFID device to determine a position of the RFID device and to initiate a transaction. When the RFID device enters a defined volume, an illuminator can be triggered, which illuminator illuminates the RFID device. Light property data for the RFID device can be collected by a sensor, and the light property data can be compared to light property information for one or several substances. If the light property data matches the light property information, then a substance can be identified as present on the surface of the object.

20 Claims, 10 Drawing Sheets

PROXIMITY STANDOFF DETECTION COUPLING DEVICE (PSDCD)

CROSS-REFERENCES TO RELATED APPLICATIONS

This application claims the benefit of U.S. Provisional Application No. 61/803,382, entitled "PROXIMITY STANDOFF DETECTION COUPLING DEVICE (PSDCD)," filed on Mar. 19, 2013, the entirety of which is hereby incorporated by reference herein.

BACKGROUND OF THE INVENTION

The importance of mass transit in a functioning society increases as urbanization increases. In many locations, mass transit is the most efficient and quickest way of reaching a desired destination. Several cities would have a significant negative financial impact if their mass transit system were to be shut down.

Due to the size and usage of mass transit systems, security of these systems is difficult. Currently, security is provided by the presence of CCTV, guards or policeman who are tasked with preventing criminal activity. While such precautions have limited many risks associated with mass transit, further security improvements are both desired and necessary.

BRIEF SUMMARY OF THE INVENTION

In one embodiment, the present disclosure provides a method of focusing a laser beam to a receiver region. The method includes providing an RFID receiver that can receive initialization event information relating to an RFID device when the RFID device is within a detectable distance from the RFID receiver, which detectable distance from the RFID receiver defines an RFID scanning region, positioning a laser scanning system a known distance from the RFID receiver such that the laser scanning system can scan the RFID scanning region, determining a distance position of the RFID device based on the received initialization event information relating to the RFID device, logging a transaction associated with the RFID device, and activating the laser scanning system, which laser scanning system includes a laser and a light detector. The method of focusing a laser beam to a receiver region includes scanning the RFID scanning region with the laser scanning system, which scanning includes illuminating the RFID scanning region with the laser, detecting a light reflective property of the surface of the RFID device, generating a value representing the light reflective property of the surface of the RFID device, and uniquely identifying a substance on a surface of the RFID device by the light reflective property.

In some embodiments of the method, the RFID receiver includes an antenna emanating radio signals, and in some embodiments, the antenna and the radio signals can initiate communication with the RFID device when the RFID device is within the detectable distance from the RFID receiver. In some embodiments, the initialization event information relating to the RFID device is received by the RFID receiver via a signal generated by the RFID receiver and reciprocated by the RFID device. In some embodiments of the method, the position of the RFID device, with respect to the scanning system, is determined via the strength of the signal received by the RFID receiver.

In some embodiments, a property of the laser is changed based on the position of the RFID device with respect to the scanning system as determined by the received initialization event information relating to the RFID device. In some embodiments, the laser outputs light having multiple frequencies, and, in some embodiments, the laser can have an array of lasers having different frequencies and/or the laser can output light of variable frequencies.

In some embodiments, the laser scanning system can identify the region within the edges of the RFID device that has entered within the detectable distance from the RFID receiver and focus on the portion of the laser scanning region occupied by the RFID device. In some embodiments, receiving information from the device can include receiving an identifier uniquely associated with an account.

In some embodiments of the method of focusing a laser beam to a receiver region, the laser scanning system is activated in response to the logging of the transaction associated with the RFID device. In some embodiments, the volume scanned by the laser scanning system defines a cone. In some embodiments, identifying a substance on the surface of the RFID device by the light reflective property includes: identifying a region of interest of the RFID device based on the detected light reflective property, focusing the laser on the region of interest of the RFID device, detecting a light reflective property of the region of interest of the RFID device, and comparing the light reflective property of the region of interest of the RFID device to a stored light reflective property of a substance. In some embodiments, the laser is focused on the region of interest of the RFID device as the RFID device is moved through the RFID scanning region, and, in some embodiments, the light detector is a detector array.

In one embodiment, the present disclosure provides a system for detection of a substance of interest on the surface of an object. The system includes a scanner having an RFID receiver. In some embodiments, the RFID receiver can receive initialization event information relating to an RFID device when the RFID device is within a detectable distance from the RFID receiver, which detectable distance from the RFID receiver defines an RFID scanning region, and determine a distance position of the RFID device based on the received initialization event information relating to the RFID device. The system can include a laser scanning system that can include a laser that illuminates the RFID scanning region, and a light detector that detects a light reflective property of an RFID device illuminated by the laser and within the RFID scanning region. In some embodiments, the laser scanning system is positioned a known distance from the RFID receiver such that the laser scanning system can scan the RFID scanning region. The system can include a processor that can log a transaction associated with the RFID device; activate the laser scanning system; direct the scanning of the RFID scanning region with the laser scanning system, which scanning can include illuminating the RFID scanning region with the laser; receive light reflective property data for the surface of the RFID device; generate a value representing the light reflective property of the surface of the RFID device; and identify a substance on a surface of the RFID device by the light reflective property.

In some embodiments of the system, a property of the laser is changed, based on the position of the RFID device with respect to the scanning system as determined by the received initialization event information relating to the RFID device, and in some embodiments, the laser scanning system can identify the region within the edges of the RFID device that has entered within the detectable distance from the RFID receiver and continually focus on the portion of the laser scanning region occupied by the RFID device. In some embodiments, the laser scanning system is activated in response to the logging of the transaction associated with the RFID device, and in some embodiments, the processor can identify a substance on the surface of the RFID device by the light reflective property by identifying a region of interest of the RFID device based on the detected light reflective property, directing the laser to continually focus on the region of interest of the RFID device, receiving light reflective property data for the region of interest of the RFID device, and comparing the light reflective property data for the region of interest of the RFID device to a stored light reflective property or signature of a substance.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
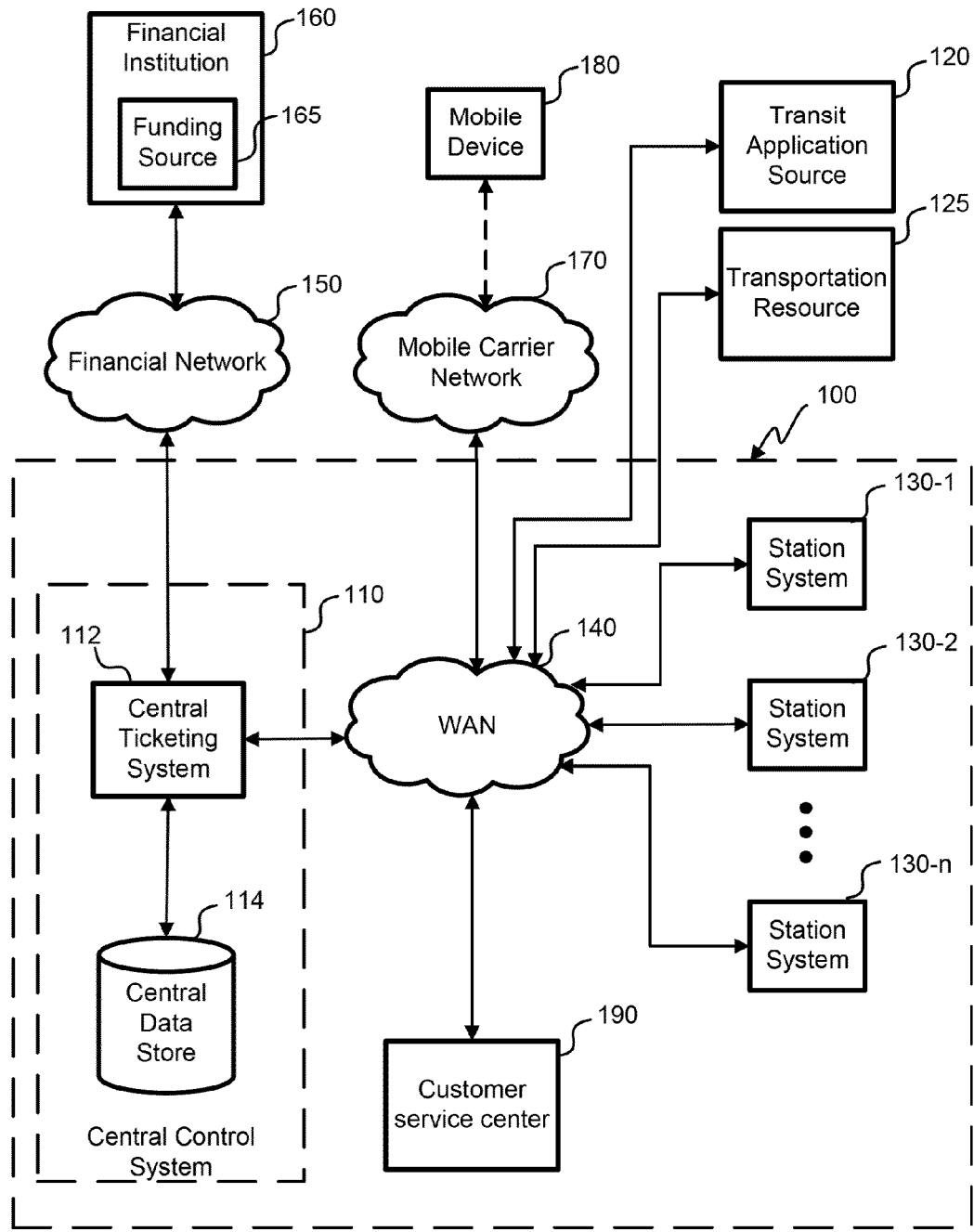
FIG. 1 is a block diagram of an embodiment of a transit system.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable and/or writeable medium. A processor(s) may perform the necessary tasks.

Some embodiments of the present disclosure relate to systems and methods that can be used to identify a user and/or a user account and to determine the presence or absence of one or several substances on the user and/or on an item or object controlled by the user, such as, for example, a user identifier, the user's clothing and/or accessories, or any other thing controlled by the user. In some embodiments, the user identifier can include contact or contactless fare media such as a ticket, and/or identification card such as, for example, a driver's license, a government identification card, a passport, a company identification card, or the like. In some embodiments, the user identifier can include information identifying the user, a user account, and/or an account associated with the user. In some embodiments, the user identifier can include the information store and/or embody the information in any desired manner. In some embodiments, for example, the information can be physically embodied in the user identifier such as, for example, in text, a computer readable code, magnetic strip, or the like, and in some embodiments, the information can be electronically embodied in the user identifier such as, for example, stored in memory in the user identifier.

In some embodiments, the system can include an access point that can include a detection system having a scanner that can receive information from the user identifier and a laser scanning system that can determine the presence or absence of one or several substances on the surface of the user or the user identifier. In some embodiments, the scanner can be any device that can receive information from the user identifier and can include, for example, a camera, a barcode reader, an RFID receiver, or the like.

In some embodiments, the scanner can receive information from the system and the access point can conduct a transaction with the user based on the information received from the user identifier and the laser scanning device can thereafter, or simultaneously, determine the presence or absence of one or several substances on the surface of the user identifier or on the user.

The laser scanner can be triggered when the user identifier enters a defined volume that is bounded by one or several distances from the scanner. In some embodiments, the defined volume comprises a distance at which the user identifier can communicate with the scanner. In some embodiments in which the scanner is an RFID device, the defined volume can be referred to as an RFID scanning region. The triggering of the laser scanner can cause the laser scanner to scan a scanning volume that at least partially coincides with the defined volume, and in some embodiments, the scanning volume includes the entirety of the defined volume.

The laser scanning system can be configured to locate and identify an object in the scanning volume, including the user, part of the user, or the user identifier, and then to focus scanning on the located and identified object. In some embodiments, the scanning of the located and identified object can include illuminating the object with light of one or several frequencies, and specifically illuminating the object with one or several laser beams having one or several frequencies. A light property of the illuminated object is then sensed and compared to known light properties of one or several substances. If the light property of all or of a portion of the object matches the known light properties of the one or several substances, then a value indicative of the detection of a substance and identifying the detected substance is associated with the transaction, the user, and/or the user account or account associated with the user.

In some embodiments, the detection of a light property corresponding to one or several substances on a portion of the object can result in the further focusing of the scanning on the portion of the object exhibiting the light property corresponding to the one or several known substances. In such an embodiment, the result of the scanning of the portion of the object exhibiting the light property corresponding to one or several known substances can be used to determine the presence or absence of one or several of the one or several known substances, and the detection of the presence of one or several of the one or several known substances can result in the association of a value indicative of the presence of one or several of the one or several known substances and can be associated with the transaction, the user, and/or the user account or account associated with the user.

Although the following discussion includes details relating to one environment in which the detection system may be implemented, a person of skill in the art will recognize that the detection system can be used in a variety of environments and circumstances.

FIG. 1 illustrates a block diagram of an embodiment of a transit system 100, in communication with other systems. The transit system 100 can be used with any desired form of transit including, for example, subway, bus, ferry, commuter rail, para-transit, airplane, etc., or any combination thereof, and can be used to coordinate and/or control the operation of the other systems in providing services, including, transportation services.

The transit system 100 can include a central control system 110. The central control system 110 can include one or more servers and/or other computing systems having processors, memories, and network interfaces for processing and communicating information.

In the specific embodiment shown in FIG. 1, the central control system can include a central ticketing system 112. The central ticketing system 112 can comprise one or more servers and/or other computing systems having processors, memories, and network interfaces for processing and communicating information. In some embodiments, the central ticketing system 112 can be configured to provide information relating to ticketing, to receive information relating to ticketing, and/or to track information relating to ticketing. In some embodiments, the central ticketing system 112 can store information within a central data store 114. This information can relate to purchasing habits of the user, purchasing habits or several users, available tickets, sold tickets, and/or any other information. It will be recognized that such a transit system 100 can be enabled for use in applications beyond transit, such as transportation systems (e.g., airline systems, car rental systems, etc.).

The transit system 100 can include one or several station systems 130. In some embodiments, the station system 130 can comprise one or several systems and/or devices located within the station and/or within a mobile environment, which systems and/or devices can be used for ticketing and/or access control. Station systems 130 can gather information regarding transactions and communicate the information to the central ticketing system 112 using a wide area network (WAN) 140. The WAN 140 can include one or more networks, such as the Internet, which one or more networks may be public, private, or a combination of both. The WAN 140 can be packet-switched or circuit-switched connections using telephone lines, coaxial cable, optical fiber, wireless communication, satellite links, and/or other mechanisms for communication. Communication between the station systems 130 and the central control system 110 may be in real time or periodic. Thus, the usage of fare media throughout the transit system 100 can be tracked. In some embodiments, changes in schedules, ticket prices, and delay notifications can be communicated from the central ticketing system 112 to the station systems 130 via the WAN 140.

In some embodiments, the transit system 100 can include a customer service center 190 that can be maintained and/or provided by the transit service provider of the transit system 100. In some embodiments, the customer service center 190 can comprise a call center and/or any other source of customer support and/or customer service.

The user can be identifiable and/or identified by the transit system 100. In some embodiments, the user can have, for example, a user account. The user account can comprise information regarding a certain user of the transit system 100, such as a name, address, phone number, email address, user identification (such as a unique identifier of the user or other user ID), passcode (such as a password and/or personal identification number (PIN)), an identification code associated with fare media used to identify a user and/or a transit user account (such as a primary account number (PAN)), information regarding user preferences and user opt-in or opt-out selections for various services, product(s) associated with the transit user account, a value and/or credit associated with the product(s), information regarding a funding source for the transit user account, and more. The transit user account can further comprise funding and transaction information, such as product information, a funding source, and a payment amount.

A transit user may request a transit user account and provide the information listed above by phone (such as a call to the customer service center 190 maintained and/or provided by the transit service provider of the transit system 100), on the Internet, at ticket booth, at a ticket vending machine, or by other means. The central ticketing system 112 can use the information provided by the user to create the transit user account, which can be stored and/or maintained on a database, such as the central data store 114 of the central control system 110.

The transit user account may include information regarding a user's preferences with regard to funding. For example, the transit user account may be configured to automatically draw a certain amount of funds from a funding source 165 each month to pay for a certain transit product or service, or to add value and/or credits to an existing transit product or service. The value and/or credits can include a monetary credit, a usage credit, and/or a usage period. Additionally or alternatively, the transit user account can be configured to automatically withdraw a certain amount of funds from the funding source 165 to add additional value and/or credits to an existing product when the value and/or credits of the existing product drops below a certain threshold level. Various other configurations are allowable by the transit user account. It will be understood that other systems of the transit system 100, such as a station system 130, may draw funds from a funding source 165. Moreover, because cash payments can also be used to fund transactions associated with a transit user account, the transit user account may not require funding source 165.

In some embodiments, the transit system 100 can transact business with the funding source 165 via a financial institution 160. In some embodiments, this transaction can occur via financial network 150, and in some specific embodiments, the central ticketing system 112 can communicate with a financial network 150 to complete a transaction with the funding source 165. In some embodiments, for example, this transaction can include verifying that sufficient funds are included within the funding source 165 to complete the transaction, requesting payment of funds associated with user selected purchase, verifying the identity of the funding source 165 and/or the financial institution 160, verifying the identity of the requesting central ticketing system 112, and receiving the funds in response to the completion of the transaction.

The funding source 165 can provide funding to allow purchase of products from the transit system 100. The funding source can be external to the central control system 110 and can be maintained, for example, by the financial institution 160. Such a funding source 165 may include a savings or checking account, a prepaid account, a credit account, an e-commerce account (such as a PAYPAL® or Account Based account), or more, which can transfer funds via automated clearing house (ACH) or other means. In some embodiments in which a user is associated with a user account, the user account can include information about the funding source 165. If the transit user account comprises information regarding a funding source 165, the central ticketing system 112 can use the information to fund purchases or other transactions of a user of the transit system 100. These transactions can be made at stations, on the Internet, by phone, by text, by email, or by a variety of other different ways, and transaction information can then be sent to the central ticketing system 112 to update the transit user account associated with the transactions and reconcile payments and purchases with the funding source 165. The central ticketing system 112 can communicate with the financial institution 160 (or other entity maintaining the funding source 165) through a financial network 150.

The central ticketing system's reconciliation with the funding source 165 may vary depending on one or more products associated with the user account and the functionality desired by a transit services provider. For example, the user account may include a running balance mirroring a balance of the funding source 165. In such a case, transactions, such as passage of a user at an access control point (such as a turnstile, faregate, platform validator, para-transit vehicle, bus, conductor handheld unit, or fare box at an entry, exit, or other location of a transit station) can be recorded and/or tracked by the central ticketing system 112 and reconciled, on a per-transaction basis and/or collectively with other transactions. Along these lines, the central ticketing system 112 may reconcile payment for the transactions with the funding source 165 as the transactions are received and/or on a scheduled basis, such as on an hourly or daily basis.

Additionally or alternatively, when transit products or services are associated with a user account, the central ticketing system 112 can draw funds from a funding source 165 less frequently. For example, a transit product can include a certain number of rides or an unlimited number of rides for a certain period of time. In this case, the central ticketing system 112 can track transactions associated with the passage of a user at an access control point (i.e., transactions in the transit system associated with a ride), but may only need to reconcile with the funding source 165 once, for the purchase of the transit product.

In some embodiments, transit system 100 can communicate with one or several users operating a mobile device 180. The mobile device 180 may be communicatively coupled with the central control system 110. Such a mobile device may be a smart phone or other mobile phone (including a near-field-communication (NFC)-enabled mobile phone), a tablet personal computer (PC), a personal digital assistant (PDA), an e-book reader, or other device. In transit system 100, a communicative link from mobile device 180 to central ticketing system 112 can be provided by a mobile carrier network 170 in communication with WAN 140. Mobile device 180 can thereby communicate with the central ticketing system 112 to access and/or manage information of a transit user account. Furthermore, the central ticketing system 112 can send messages to the mobile device 180, providing transit, account, and/or advertisement information to a user of the transit system 100 in possession of the mobile device 180. Such messages may be based on, among other things, opt-in or opt-out selections and/or other user preferences as stored in a transit user account. In some embodiments, the mobile carrier network 170 can comprise any mobile communication network including, for example, a cellular network, a radio network, and/or the like.

A transit user can use the mobile device 180 to download a transit application from a transit application source 120. The transit application source 120 may be an application store or website provided by a mobile carrier, the hardware and/or software provider of the mobile device 180, and/or the transit service provider. The transit application can be uploaded or otherwise provided to transit application source 120 by the transit service provider. According to some embodiments, the transit application can provide additional functionality to the mobile device 180, including enabling an NFC-enabled mobile device to be used as fare media and access control points of the transit system 100.

In some embodiments, the transit system 100 can communicate with a transportation resource 125. The transportation resource 125 can comprise a source of information relating to one or several modes of transit. This information can include, for example, one or several schedules, including, for example, the departure and/or arrival times of one or several modes of transit from one or several locations, price information, current transit location information including, for example, the current location of an en route mode of transit, disruption information including, for example, data relating to any circumstances or conditions that will result in and/or have resulted in an arrival and/or departure time deviation from the schedule, a dynamic schedule which can, for example, identify whether the mode of transit is ahead, behind, or on schedule, or the like. In some embodiments, the transportation resource 125 can comprise one or several servers that can be, for example, located within the mode of transit, in communication with the mode of transit, and/or separate from the mode of transit.

A user can access and/or use the transit system 100 in a variety of ways. In some embodiments, for example, the user can access the transit system 100 via the mobile device 180 and/or via one or several of the station systems 130.

Figure 2:
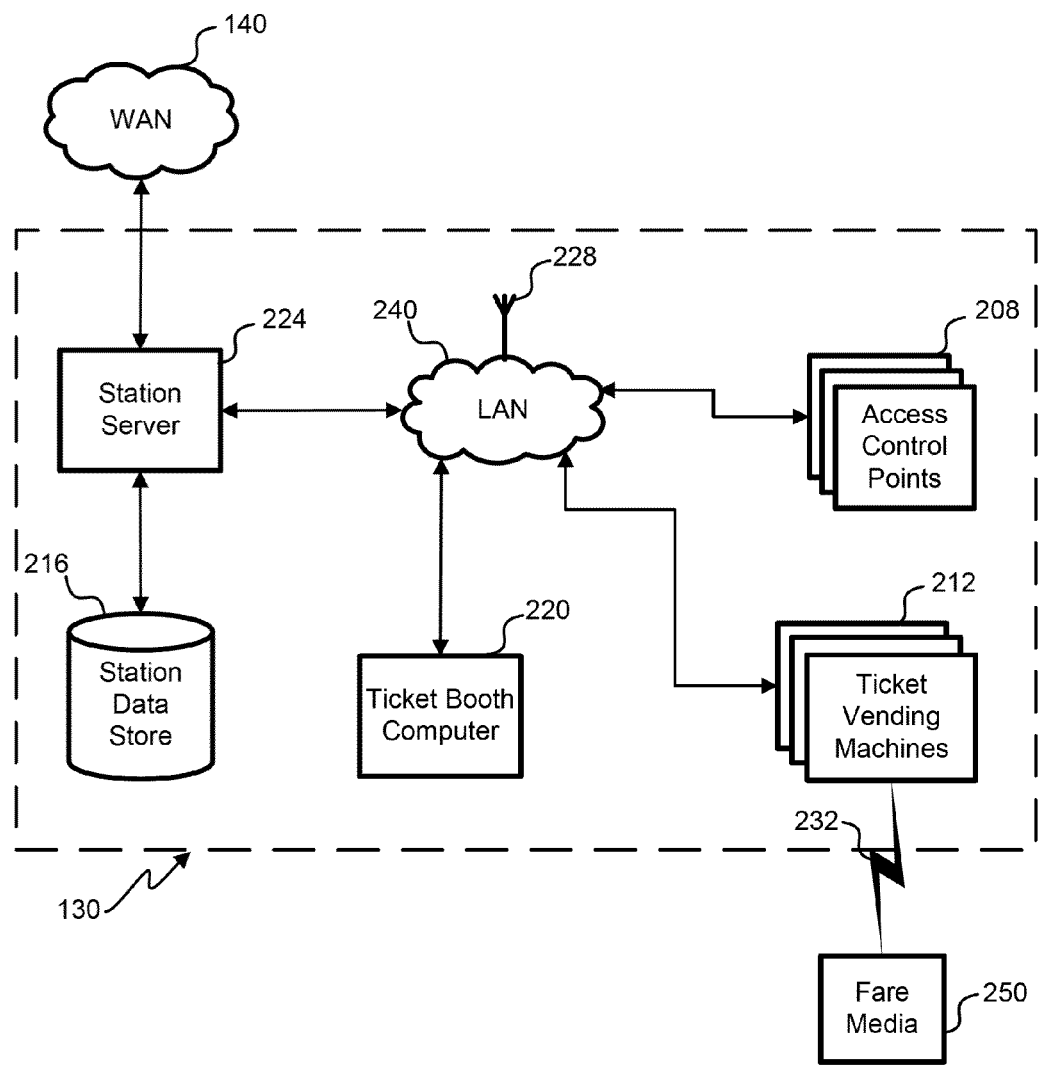
FIG. 2 is a block diagram of an embodiment of a station system.

FIG. 2 shows a block diagram of an embodiment of a station system 130. In some embodiments, the station system 130 can control ticketing operations and/or other operations relating to and/or involving the transit system 100. In some embodiments, the station system 130 can be associated with a specific geographic location such as, for example, a train station, an airport, a subway station, a bus station, a dock, a harbor, a retail location and/or any other location, and in some embodiments, the station system 130 can be associated with a mode of transit such as, for example, a bus, train, taxi, boat, ferry, airplane, lift, and/or any other mode of transit.

As discussed above, the transit system 100 can include various forms of transit, such as subway, bus, ferry, commuter rail, para-transit, and more. Because different forms of transit may require different functionality, various station systems 130 may have some or all of the components shown in the block diagram. The components of the station system 130 can be communicating the links to each other so as to allow the sending and receiving of information between the components of the station transit system 130. In some embodiments, this link can comprise a wired and/or wireless network. In the embodiment shown in FIG. 2, the components of the station system 130 can be linked by a local area network (LAN) 240. The local area network (LAN) 240 10 couple the various systems together and can include point-to-point connections, packet switched connections, wireless connections, and/or other networking techniques.

The station transit system 130 can include one or several access points 208. The access points 208 can include any system, feature, or features that interact with the user to conduct a transaction and to determine the presence or absence of one or several known substances on an object. In some embodiments, the access point 208 can include, without limitation, a turnstile, a faregate, a platform validator, conductor handheld unit, and/or fare box at an entry, exit, or other location of a transit station.

The station transit system 130 can include a station server 224 that can be coupled to the WAN 140 to allow communication with the central ticketing system 112. Processing of local information can be performed on the station computer server 224. For example, fare information, schedule information, delay update information, and other transit-related information can be processed at the station server 224 and communicated to the various other machines in the transit system 100.

A ticket booth computer 220, and transit vending machines (TVMs) 212 can communicate with the central ticketing system 112 through the station computer server 224 or directly with the central ticketing system 112 through LAN 240 or WAN 140 (e.g., the Internet).

The TVMs 212, and one or more ticket booth computers 220, can communicate with the station server 224 via the LAN 240. This communication can be transmitted via a physical connection or wireless connection via one or more antennas 228. Transactions at access control points 208, TVMs 212, and one or more ticket booth computers 220 can be communicated to the station server 224, stored at station data store 216, and/or transmitted to the central ticketing system, which can update information in a transit user account accordingly.

Various portable and/or handheld media with a unique identifier can be used as fare media, whether or not the media are issued by a transit services provider. Such media can include identification cards, payment cards, personal electronic devices, bar codes and items having bar codes, contactless devices, and more. Contactless devices can include media having a unique identification code readable by access control points though NFC signals (e.g., radio frequency (RF) signals). By way of example, but not by limitation, such contactless devices can include devices comprising RFID tags and/or RFID-tagged items, contactless payment cards (including but not limited to credit cards, prepaid cards, debit cards, or other bank cards or contactless smart cards), contactless identification cards and/or fobs, and NFC-enabled mobile devices.

Fare media 250 can have multiple sources of information, which may be read automatically by certain systems and devices in the transit system 100, depending on desired functionality. For contactless devices, such sources can include an IC, memory, and/or contactless interface of the device. Additionally or alternatively, contactless devices and other forms of fare media 250 can include a magnetic stripe, a bar code, and/or data imprinted and/or embossed on the device, which can serve as additional sources of information. Contactless and other sources of information can serve as repositories of account information related to, for example, a financial or user account associated with the fare media 250 (which may not be associated with the transit system 100).

TVMs 212 may interact directly with a fare media 250 through, for example, a contactless connection 232. Although communication of the contactless connection 232 may be two way, fare media 250 may simply communicate an identification code to TVM 212. This can be done, for example, to authenticate a contactless device for use as fare media 250 in the transit system 100. A contactless device does not have to be issued by a transit service provider in order to be authenticated and used as fare media 250 in the transit system, as long as the information communicated by the fare media 250 to the TVM 212 (and subsequently to access control points 208 for passage in the transit system 100) serves to uniquely identify the fare media 250. Such an authentication process is provided in greater detail below.

All or part of the information communicated by the fare media 250 can be used as an identification code to identify the transit fare media 250. This identification code can comprise one or more fields of data including or based on information such as a name, a birth date, an identification number (such as a PAN), a Social Security number, a driver's license number, a media access control (MAC) address, an electronic serial number (ESN), an international mobile equipment identifier (IMEI), and more. Because the identification code is unique, it can be associated with a transit user account, and utilized by a user at a TVM 212 to access and/or update information associated with the transit user account.

In some instances, an identification code may be assigned by a transit service provider and written to the fare media 250, such as an NFC-enabled mobile device 280. For example, a transit application running on an NFC-enabled phone can generate or otherwise provide an identification code to be transmitted from the phone at control points of the transit system 100. In other instances, if TVM 212 is utilized to enable a user to create a transit user account, the TVM 212 may also write an identification code to an unused portion of a memory of the fare media, such as integrated circuit chip file space on a smart card or an NFC component on the NFC-enabled mobile device 280.

Figure 3:
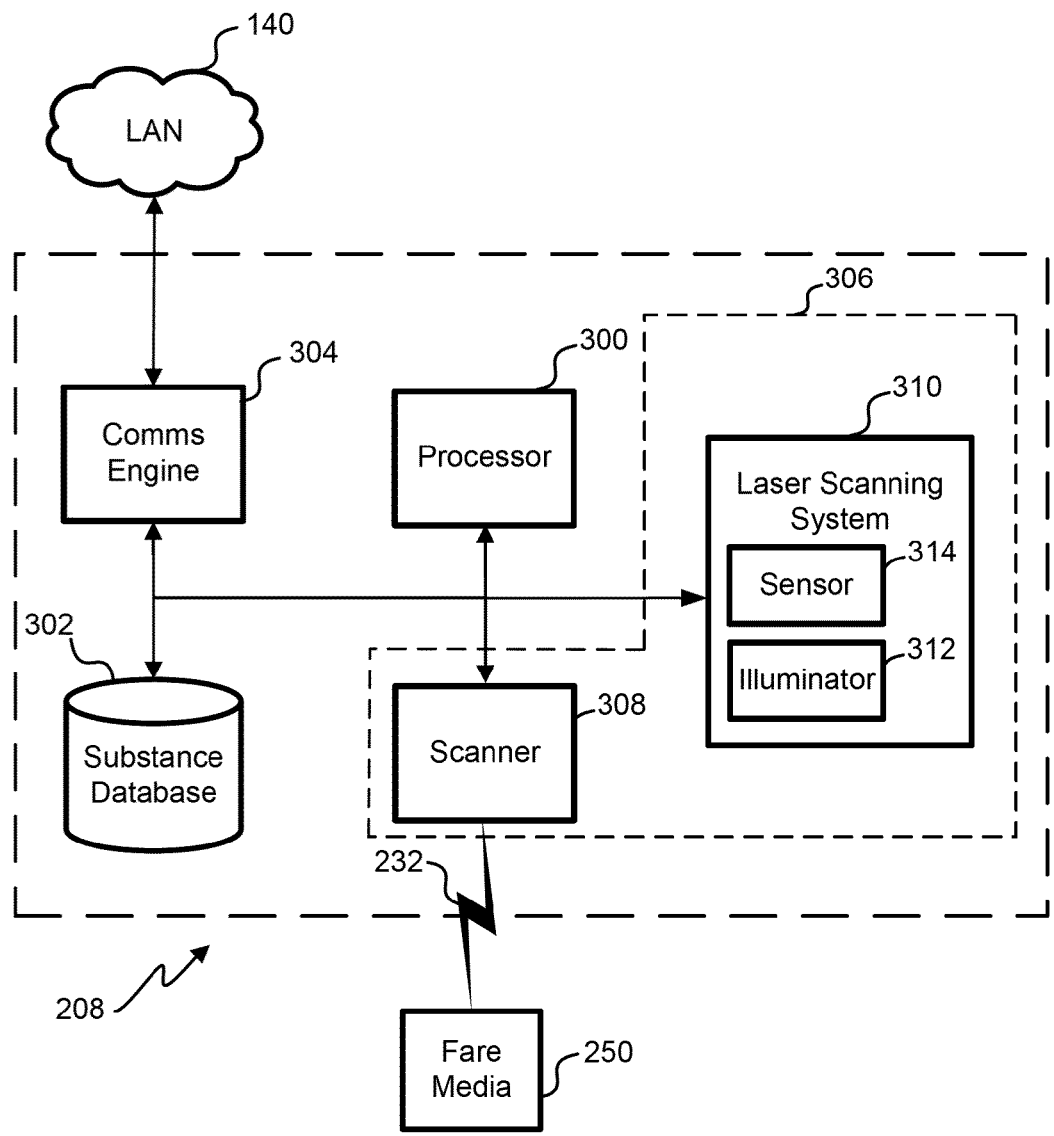
FIG. 3 is a block diagram of one embodiment of an access control point.

With reference now to FIG. 3, a schematic illustration of one embodiment of the access control point 208 is shown. The access control point 208 can include a processor 300. The processor 300 can provide instructions to, and receive information from, the other components of the access control point 208. The processor 300 can act according to stored instructions, which stored instructions can be located in memory associated with the processor and/or in other components of the access control point 208. The processor 300 can be a microprocessor, such as a microprocessor from Intel® or Advanced Micro Devices, Inc.®, or the like.

In some embodiments, and as depicted in FIG. 3, the access control point 208 can include several databases, and specifically can include a substance database 304. In some embodiments, the substance database can include information relating to a property of one or several substances, which property can be, for example, an optical property, reflective properties such as a light reflective property, or the like. In some embodiments, the substance database 304 can include information identifying the type of substance and/or categorizing the one or several substances stored within the substance database 304. In one embodiment, for example, a substance may be categorized as a dangerous substance, illicit substance, hazardous substance, or the like. In one embodiment, for example, an oxidizer or an explosive may be categorized and/or identified as a dangerous substance, an illegal drug can be categorized as an illicit substance, and, for example, a carcinogen can be categorized as a hazardous substance. In some embodiments, the substance database 304 can further include information relating to a response based on identified substance, unidentified type a substance, and/or unidentified categorization of the substance. The response stored within the substance database 304 can include any number of responses ranging from, for example, a denial of entry into an area and/or prohibiting passing past the access control point 208, to a request for immediate intervention and/or law enforcement assistance. In some embodiments, the response can include updating a value associated with the user, the user account, and/or an account associated with the reflective detecting presence of a substance, the date of the detection, and/or an identification of the tech substance including, for example, a substance type/or categorization.

In some embodiments, the access control point 208 can include a communications engine 304. The communications engine 304 allows the access control point 208 to access the other components of the station system 130. The communications engine 304 can include features configured to send and receive information, including, for example, an antenna, a modem, a transmitter, a receiver, or any other feature that can send and receive information. The communications engine 304 can communicate via telephone, cable, fiber-optic, or any other wired communication network. In some embodiments, the communications engine 304 can communicate via cellular networks, WLAN networks, or any other wireless network.

In some embodiments, the access control point 208 can include a detection system 306. In some embodiments, the detection system 306 can include one or several features, or systems, that can perform a transaction with a user such as, for example, identifying the user, identifying a user account, identifying an account associated with the user, verifying user payment, receiving user payment, validating a user ticket, pass, or card, or the like. In some embodiments, the detection system 306 can include one or several features, or systems, that can determine the presence or absence of one or several substances on an object.

In the embodiment depicted in FIG. 3, the detection system 306, also referred to herein as the Vicinity and/or Proximity Detection Coupling Device ("VPDCD") includes a proximity and/or vicinity Detector 308, also referred to herein as a Vicinity and/or Proximity Coupling Device ("VPCD") or a Proximity Standoff Detection Coupling Device ("PSDCD"), that is configured to perform a transaction with the user. The proximity and/or vicinity detector 308 can be any device, feature, and/or system that can perform transactions with the user. In some embodiments, the proximity and/or vicinity detector 308 can be a reader or receiver, including a receiver/transmitter such as, for example, an RFID reader or receiver, including an RFID receiver/transmitter. In some embodiments, the proximity and/or vicinity detector 308 can be configured to retrieve and/or receive information from a user identifier. In some embodiments, the user identifier can include fare media 250 such as a ticket, and/or an identification card such as, for example, a driver's license, a government identification card, a passport, a company identification card, or the like. In some embodiments, a user identifier can include information stored on a user identifier. In some embodiments, this information is physically stored on the user identifier such as, for example, via computer-readable code such as a barcode or coding within a magnetic strip, via one or several text strings, or the like, and in some embodiments, this information is electronically stored on the user identifier such as, for example, in memory associated with user identifier.

The proximity and/or vicinity detector 308 can be configured to retrieve and/or receive information from the user identifier. In some embodiments, for example, the proximity and/or vicinity detector 308 can include one or several cameras, one or several code readers such as, for example, an electronic barcode reader such as an electronic circuit barcode reader, one or several RFID receivers, one or several antennas, or the like. The proximity and/or vicinity detector 308 can be configured to receive and/or retrieve information from the user identifier when the user identifier is within a defined volume, also referred to herein as an RFID scanning region.

The detection system 306 can include a laser scanning system 310 that can be configured to detect an optical and/or light property of an object to determine the presence or absence of one or several substances on the surface of the object. In some embodiments, the laser scanning system 310 can include an illuminator 312. The illuminator 312 can be any device configured to generate electromagnetic radiation and to project electromagnetic radiation in a desired direction. In some embodiments, the illuminator 312 can include a source of electromagnetic radiation, control circuitry, and the power source. In one embodiment, the illuminator 312 can include one or several lasers, one or several LEDs, and/or one or several laser LEDs. In some embodiments, the source of electromagnetic radiation can be configured to generate electromagnetic radiation having a single frequency and/or wavelength, or having a plurality of frequencies and/or wavelengths. In one embodiment, for example, the source of electromagnetic radiation can comprise a plurality of sources, each configured to generate electromagnetic radiation having a single, or single range of wavelengths and/or frequencies. In some embodiments, several of the plurality of sources are configured to generate electromagnetic radiation having different frequencies and/or different ranges of frequencies, thereby together creating a single source of electromagnetic radiation capable of controllably generating electromagnetic radiation at different wavelengths and/or frequencies. In some embodiments, the source of electromagnetic radiation can be configured to allow modulation of the wavelength and/or frequency of the generated electromagnetic radiation.

In some embodiments, the illuminator 312 can be configured to illuminate a volume referred to herein as a scanning volume, laser scanning volume or a laser scanning cone. In some embodiments, the illuminator 312 can be positioned with respect to the proximity and/or vicinity detector 308 such that the scanning volume at least partially coincides with the defined volume, and in some embodiments, the illuminator 312 can be positioned with respect to the proximity and/or vicinity detector 308 such that the scanning volume completely envelops the defined volume.

In some embodiments, the eliminator 312 can be configured to illuminate the entire scanning volume and/or to illuminate a portion of the scanning volume. In embodiments in which the illuminator 312 is configured to illuminate a portion of the scanning volume, the illuminator 312 can be manipulable such that, if the entirety of the scanning volume is not simultaneously illuminated, each portion of the scanning volume can be illuminated. In some embodiments, the illuminator can be configured so as to allow change in the size of the portion of the scanning volume that is illuminated. In one embodiment, for example, the portion of the scanning volume that is illuminated can be changed by changing the focus of the illuminator 312. Thus, in some embodiments, the illuminated area can be larger or smaller, based on the focus of the illuminator 312.

In some embodiments, the size and shape of the scanning volume can be determined by one or several aspects of the illuminator 312. In one embodiment, for example, the depth of the scanning volume as measured from the illuminator 312, can be determined by the strength of the illumination and/or the power provided to the illuminator 312. Similarly, in some embodiments, the width and/or height of the scanning volume can be determined by the degree to which the illuminator 312 can be focused and/or unfocused and/or the degree to which the illuminator 312 can be manipulated.

The laser scanning system 310 can include a sensor 314. The sensor 314 can be configured to detect an optical property of the object illuminated by the illuminator 312. In some embodiments, the sensor 314 can comprise one or several photo sensors configured to detect one or several light reflective properties of the illuminated object. In one embodiment, for example, the sensor 314 can detect the magnitude and/or frequency of electromagnetic radiation reflected off of the surface of the object and/or emitted by the object.

Figure 4:
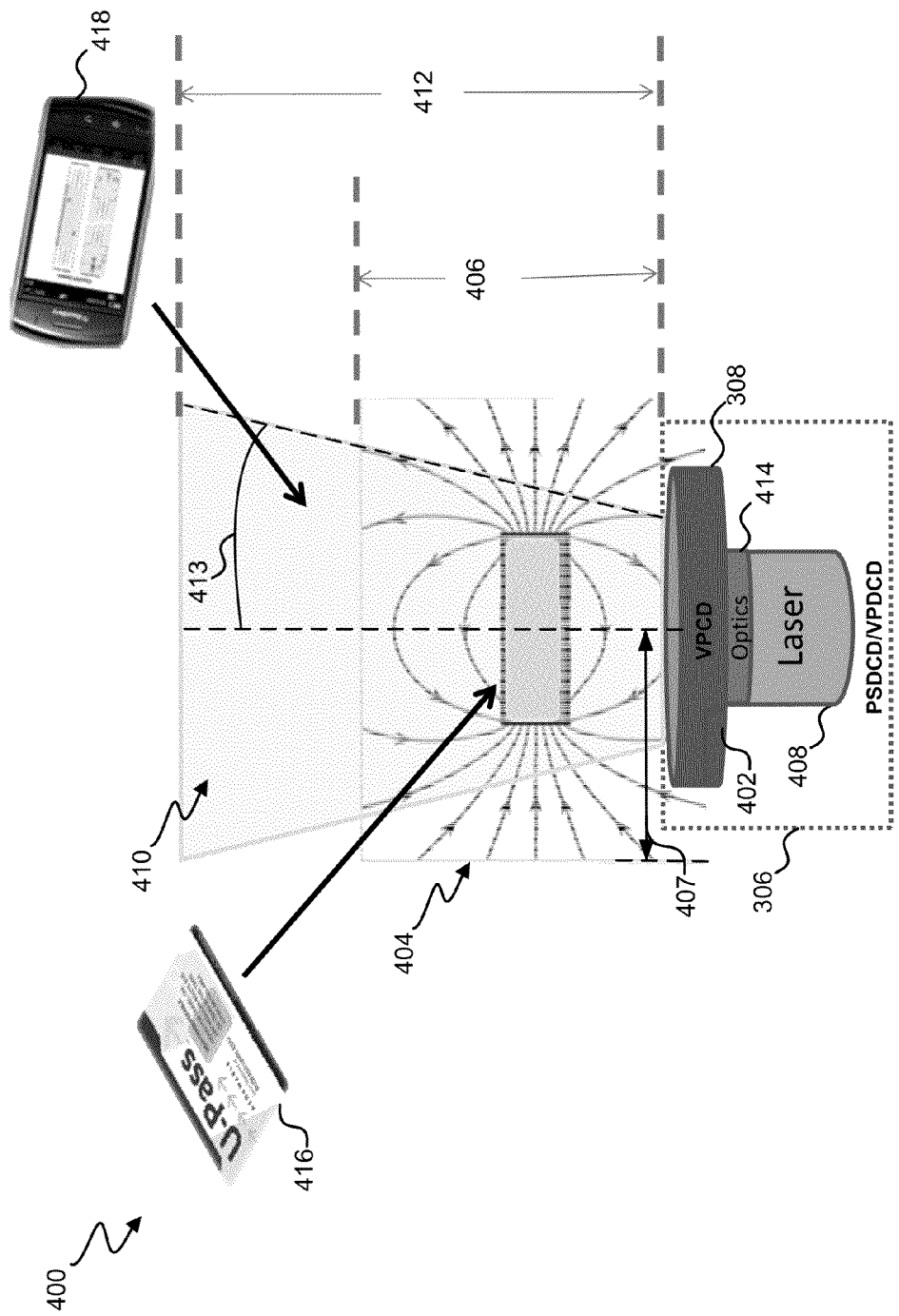
FIG. 4 is a schematic illustration of one embodiment of the detection system.

With reference now to FIG. 4, a schematic illustration of one embodiment of 400 the detection system 306 and the operation of the detection system 306 is shown. The detection system 306 shown in FIG. 4 is configured to receive information from the user identifier via radio signals. As seen in FIG. 4, the detection system 306 includes the proximity and/or vicinity detector 308, a portion of which can be an antenna 402 to send signals to, and receive signals from the user device. The antenna 402 can comprise a variety of shapes and sizes and can be made from a variety of materials. In the embodiment depicted in FIG. 4, the antenna 402 comprises a disc-shaped, right cylinder. Further, the antenna 402 can comprise a wide variety of antennas and antenna designs. In some embodiments, the antenna 402 can comprise a dipole antenna, and in some embodiments the antenna 402 can comprise a precision dipole antenna such as, for example, a precision conical dipole antenna.

As seen in FIG. 4, a field 404 is admitted and/or generated by the antenna 402. The field can comprise a variety of shapes and sizes, based on the antenna 402 and the antenna design, as well as on the power supply to the antenna. In some embodiments, the region of the field 404, in which the antenna can successfully transmit signals to and receive signals from the user device, is the defined volume, also referred to herein as the RFID scanning volume and/or the RFID scanning region. In some embodiments, the distance from the scanner to the boundary of the defined volume can comprise a detectable distance. In some embodiments, the scanner and the user identifier can communicate when the user identifier is within the detectable distance.

The defined volume can be defined by one or several dimensions that can be, for example, one or several distances measured from a service of the antenna 402. In the embodiment depicted in FIG. 4, the defined volume is defined by a first dimension 406 that is measured perpendicular to the top of the antenna 402 and the second dimension 407 measured parallel to the top of the antenna 402 and from the center of the antenna 402. In some embodiments, the first dimension 406 can be approximately 1 cm, 2 cm, 5 cm, 10 cm, 20 cm, 50 cm, 100 cm, or any other or intermediate measure. Similarly, in some embodiments, the second dimension can be approximately 1 cm, 2 cm, 5 cm, 10 cm, 20 cm, 50 cm, 100 cm, or any other or intermediate measure.

The detection system 306 can further include a source of electromagnetic radiation including, for example, a laser 408. As discussed above, the laser can comprise any desired laser emitting any desired wavelength from the range of wavelengths of electromagnetic radiation. As seen in FIG. 4, the laser is positioned and configured to illuminate a scanning volume 410, which scanning volume can encompass all or portions of the defined volume 404. Advantageously, positioning and configuring the laser 408, such that the scanning volume 410 encompasses the entirety of the defined volume 404, can facilitate triggering of the laser 408 and can allow the longest possible time for the laser 408 to scan the object.

In some embodiments, the scanning volume 410 comprises a variety of shapes and sizes. In the embodiment depicted in FIG. 4, the scanning cone comprises a truncated cone that is defined by a first dimension 412 and a second dimension 413. As seen in FIG. 4, the first dimension is a linear dimension measured perpendicular to the top of the antenna 402. In some embodiments, the first dimension can be approximately 1 cm, 2 cm, 5 cm, 10 cm, 20 cm, 50 cm, 100 cm, 200 cm, or any other or intermediate measure. In some embodiments, the magnitude of the first dimension can be controlled by the type of electromagnetic radiation generated, including, for example, the wavelength of the electromagnetic radiation, and the power of the generated electromagnetic radiation. Advantageously, manipulation of the first dimension 412 of the scanning volume 410 can facilitate use of the detection system 306 by either increasing or decreasing the risk of ocular damage associated with using the detection system 306. In some embodiments, for example, the first dimension 412 of the scanning volume 410 can be limited such that illumination by the laser 408 does not present a danger to the user's eye. In some embodiments, the power of the laser 408 and/or other illuminator 312, and thereby also the first dimension 412 of the scanning volume 410, can be limited by government action including, for example, law or regulation.

In some embodiments in which the scanning volume 410 comprises a cone, the second dimension 413 can comprise an angle measured with respect to the center line of cone, which can be coincident with the centerline of the antenna 402 and/or of the defined volume 404. In embodiments in which the second dimension 413 comprises an angle, the second dimension can comprise 0.5 degrees, 1 degree, 5 degrees, 10 degrees, 20 degrees, 30 degrees, 45 degrees, 60 degrees, 89 degrees, or any other or intermediate angle.

The detection system 306 can be, in some embodiments, used with an RFID device that can include passive, active, and semi-active RFID devices. In some embodiments, the RFID device can further include a near field communication (NFC) device. As further seen in FIG. 4, in some embodiments, the detection system 306 can be used with a passive device 416 that is energized by the antenna 402 such as, for example, a passive RFID device, and in some embodiments, the detection system 306 can be used with an active device 418 that is self-powered and/or partially self-powered such as, for example, an active RFID device, a semi-active RFID device, and/or a NFC device such as, for example, a cellular phone, a smart phone, a tablet, a mobile device, or the like. In some embodiments, a passive device 416 can communicate with the detection system 306 at a range different from the range at which an active device can communicate with the detection system 306. In such an embodiment, the detection system can be configured to delay communication with the active device 418 and/or to delay triggering of the illuminator 312 until the active device is within the scanning volume 410. Thus, in some embodiments, the illuminator 312 may be triggered when a passive device 416 enters the defined volume 404, and in some embodiments, the illuminator 312 may be triggered when an active device enters the scanning volume 410.

Figure 5:
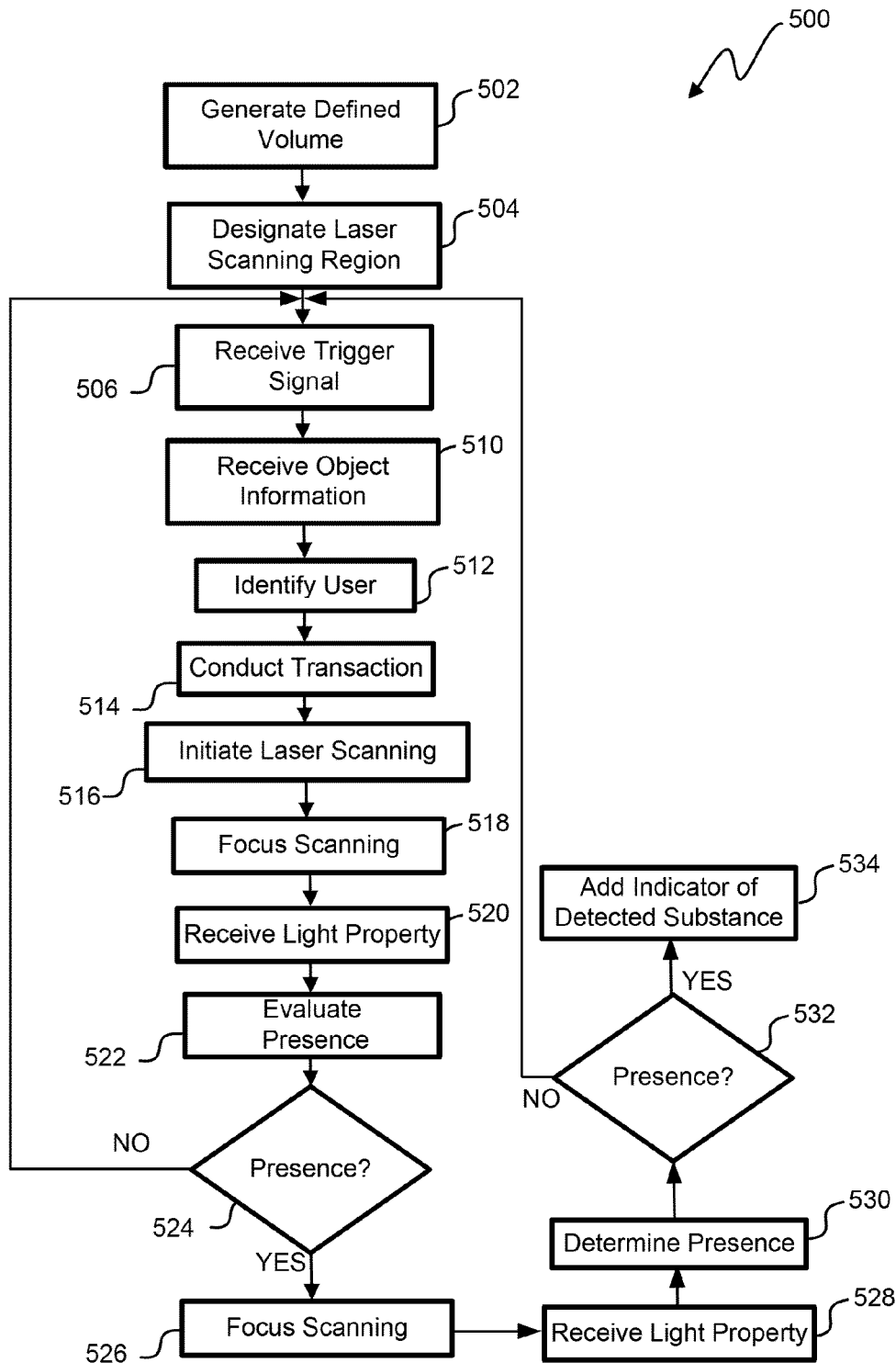
FIG. 5 is a flowchart illustrating one embodiment of a process for operation of an access control point.

With reference now to FIG. 5, a flowchart illustrating one embodiment of process 500 for operation of an access control point 208 is shown. The process begins at block 502 wherein a defined volume is generated. The defined volume, which is the volume in which the proximity and/or vicinity detector 308 of the access point 208 can communicate information with a passive device 416, can be generated by the proximity and/or vicinity detector 308. In some embodiments, the defined volume can be generated by the proximity and/or vicinity detector 308 when the proximity and/or vicinity detector 308 is powered.

After the defined volume has been generated, the process 500 proceeds to block 504 wherein the scanning volume, also referred to herein as the scanning region and/or laser scanning region, is designated and/or identified. In some embodiments, part of the identification and/or designation of the laser scanning volume can include the placement of the laser scanning system 310. In some embodiments, the laser scanning system 310 can be placed a known distance from the proximity and/or vicinity detector 308 such that the laser scanning system 310 can scan the entirety of the defined volume. In some embodiments, and as discussed above, the scanning region can envelop all or portions of the defined volume and can be the region in which optical properties can be determined.

After the scanning region has been designated, the process 500 proceeds to block 506 wherein a trigger signal is received. In some embodiments, the trigger signal can be a communication between the user identifier and the proximity and/or vicinity detector 308, which communication establishes the position of the user identifier as within one or both of the defined volume and the scanning volume. In some embodiments, the trigger signal can be received in response to the initialization of the user identifier, such as, for example, the initialization of an RFID device. In some embodiments, the trigger signal can comprise initialization event information relating to the RFID device. In some embodiments, the initialization event information can be received by the proximity and/or vicinity detector 308 which can be an RFID receiver, via a signal generated by the RFID receiver and reciprocated by the user identifier, such as an RFID device. In embodiments in which the user identifier is a passive device, the trigger signal can be received when the user identifier enters into the defined volume, and in embodiments in which the user identifier is an active and/or semi-active device, the trigger signal can be received when the user identifier enters into one or both of the defined volume and the scanning region. In some embodiments, and in connection with the receipt of the trigger signal, the position of the object and/or user identifier can be approximated. In some embodiments, the position of the object and/or user identifier can be approximated based on the strength of the signal received from the user identifier by the proximity and/or vicinity detector 308. In some embodiments, for example, the strength of the signal received from the user identifier can vary based on the distance between the user identifier and the proximity and/or vicinity detector 308. In some embodiments, the approximate position of the object and/or user identifier with respect to the proximity and/or vicinity detector 308 can be determined, using capabilities of the object and/or user identifier such as, for example, location identification capabilities including, for example, GPS capability. In some embodiments, the position of the user identifier as determined by the user identifier can be communicated to the proximity and/or vicinity detector 308.

After the trigger signal has been received, the process 500 proceeds to block 510 wherein object information is received. In some embodiments, the receipt of the object information includes receiving the information stored on and/or associated with the user identifier. In some embodiments, this information can identify the nature of the user identifier, uniquely identify the user identifier, identify a user or a user account, and/or identify an account associated with the user. In some embodiments, this information can be received by the proximity and/or vicinity detector 308 of the detection system 306.

After the object information has been received, the process 500 proceeds to block 512 wherein the user is identified. In some embodiments, identifying the user can comprise comparing object information, which can be uniquely associated with a user and/or a user account or account associated with a user, to a database and/or library of users, user accounts, and/or account associated with users. In some embodiments, this library can be stored within a database such as, for example, the central data store 114 and/or the station data store 216. In some embodiments, this comparison can be performed by the processor 300 of the access point 208.

After the user has been identified, the process 500 proceeds to block 514 wherein the transaction is conducted and/or logged. In some embodiments, conducting the transaction can include, for example, determining a cost and/or value associated with the offer, good and/or service, determining a value associated with the user, the user account, user identifier, and/or an account associated with the user, and if the value is greater than or equal to the cost, providing the proposed good and/or service and decrementing the value by a value equal to the cost. In some embodiments, the transaction can be performed by a component of the station system 130.

After the transaction has been conducted, the process 500 proceeds to block 516 wherein laser scanning is initiated. In some embodiments, laser scanning can be performed by the illuminator 312. In some embodiments, the laser scanning can include using the illuminator 312 to determine the exact position of the user identifier within the scanning region. In some embodiments, the scanning can include the illuminating of the object with electromagnetic radiation of different frequencies. In some embodiments, this illumination of the object with electromagnetic radiation of different frequencies can occur simultaneously in that the object is illuminated with multiple frequencies of electromagnetic radiation at a single time, and in some embodiments, the illumination of the object with electromagnetic radiation of different frequencies can be serial in that the object is illuminated with different frequencies of electromagnetic radiation at different times. In some embodiments, this illumination with multiple frequencies of electromagnetic radiation can be achieved through the use of an array of, for example, lasers having different frequencies, and/or having a laser with manipulable output.

In some embodiments, after the laser scanning has been initiated, the process 500 proceeds to block 518 wherein the scanning is focused. In some embodiments, the scanning can be focused on the approximate location of the object and/or user identifier, and in some embodiments, the scanning can be focused based on the exact position determined by the laser scanning.

After the scanning has been focused, the process 500 proceeds to block 520 wherein the light property is received. In some embodiments, the light property is received by the sensor 314. In one embodiment, the light property is magnitude and frequency of light reflected off the surface of the object and/or the user identifier. In some embodiments, the receipt of the light property can include the generation of a value representing the light property, and specifically a light reflective property. In some embodiments, this value can be the digitized data generated by the sensor 314. After the light property has been received, the process 500 proceeds to block 522 wherein the presence or absence of a substance on the surface of the object and/or user identifier is evaluated. In some embodiments, this can include, for example, the comparison of received light property information with a library of stored light property information for one or several substances, which library can be located in, for example, the substance database 302. In the event that received light property information matches stored light property information, a substance is identified as being on the surface of the object and/or user identifier.

After the presence of a substance on a surface of the object and/or user identifier has been evaluated, the process 500 proceeds to decision state 524 wherein the presence of a substance on a surface of the object and/or a user identifier is determined. In some embodiments, this determination can include identifying whether a match has been made between received light property and light property data stored within the library of light property data, and if a match has been made, identifying the substance. If it is determined that the received light property data does not match any of the stored light property data, then it is determined that the surface of the object and/or user identifier does not contain a target substance, and the process 500 returns to block 506 and proceeds as outlined above.

If it is determined that the surface of the object and/or user identifier contains a target substance, then the process 500 proceeds to block 526, wherein the scanning is further focused. In some embodiments, scanning can be focused on specific regions of the object and/or user device exhibiting the light property indicative of the substance identified as being on the surface of the object and/or user identifier. In some embodiments, this focusing of the scanning allows for more accurate and precise evaluation of whether the identified substance, or any other substance, is on the surface of the object and/or user identifier.

After the scanning has been focused, the process proceeds to block 528 wherein a light property for the scan portion of the object and/or user identifier is received. In some embodiments, this step can replicate step 520 and differ only in degree of focus of the scanning used to generate light property. After the light property has been received, the process 500 proceeds to block 530, wherein the presence of a substance on the surface of the object and/or user identifier is evaluated. In some embodiments, this can include comparison of the received light property to light property data stored within one of the libraries and associated with a substance. After the presence of a substance on the surface of the object and/or user identifier has been evaluated, the process 500 proceeds to decision state 532, wherein it is determined if one of the substances in the library is on the surface of the object and/or user identifier. In some embodiments, this can include determining if the received light property matches by property data stored within the library. If it is determined that the surface of the object does not contain a substance identified in the library, then the process 500 returns to block 506 and proceeds as outlined above.

If it is determined the surface of the object contains a substance identified in the library, then the process 500 proceeds to block 534 wherein an indicator of the detected substance is added to a database such as, for example, the substance database 302. In some embodiments, the addition of an indicator of the detected substance to the substance database 302 can include associating the indicator of the detected substance with the user, the user identifier, the user account, and/or an account associated with the user. In some embodiments, the indicator of the detected substance can trigger one or several responses based on, for example, the type of substance.

Figure 6:
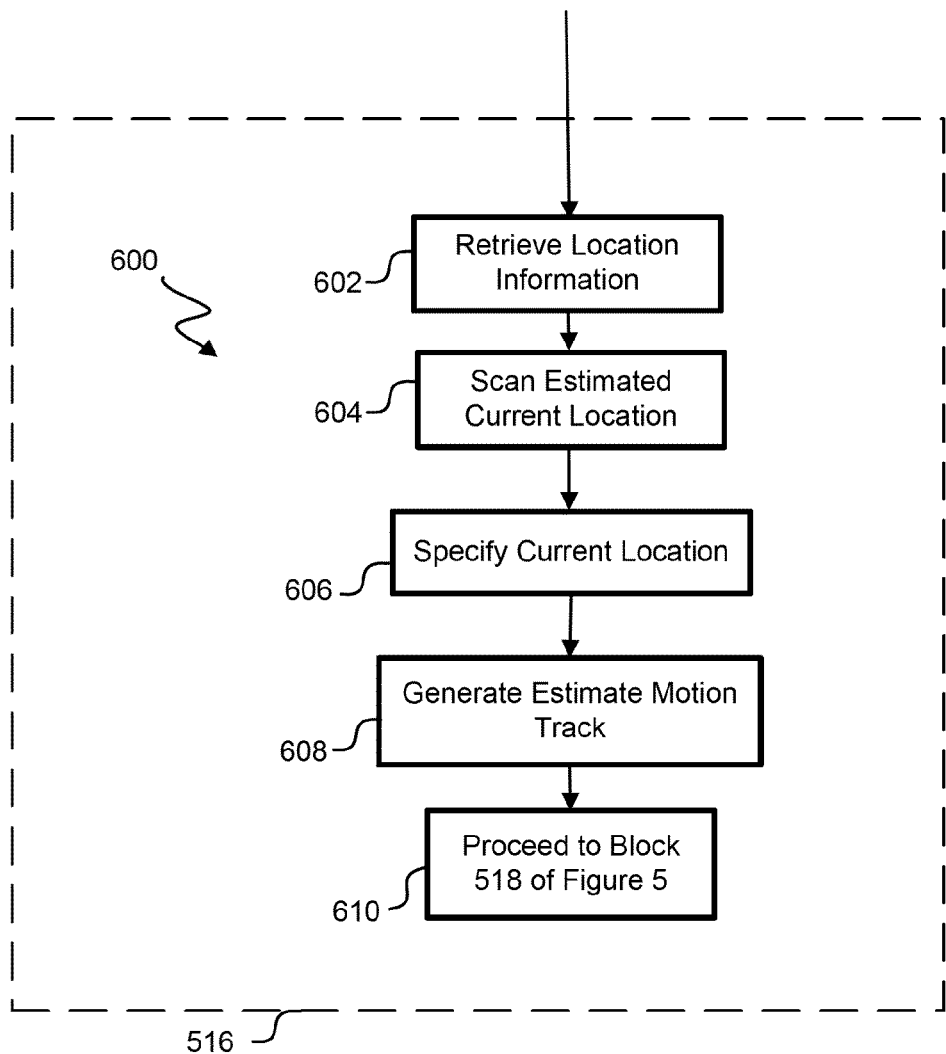
FIG. 6 is a flowchart illustrating one embodiment of a process for determining the location of an object and/or user identifier.

With reference now to FIG. 6, a flowchart illustrating one embodiment of a process 600 for determining the location of an object and/or user identifier is shown. In some embodiments, the process 600 can be performed in the place of block 516 of process 500 of FIG. 5. The process begins at block 602 wherein location information is retrieved. In some embodiments, the location information can be retrieved from the object and/or user identifier such as, for example, when the user identifier is an active device 418. In some embodiments, the location information can be retrieved based on signals received from the object and/or user identifier. In some embodiments, for example, in which the user identifier is a passive device 416, the approximate location of the user identifier is determined by the strength of the signal received by the proximity and/or vicinity detector 308 from the user identifier.

After the location information has been retrieved, the process 600 proceeds to block 604, wherein the estimated current location of the user identifier is scanned. In some embodiments, for example, the location information retrieved in block 602 provides approximate location of the user identifier but does not provide an exact location of the user identifier with respect to the laser scanning system 310. In such an embodiment, the laser scanning system 310 can be configured to scan the approximate location of the user identifier.

After the estimated current location of the user identifier has been scanned, the process 600 proceeds to block 606, wherein the current location and user identifier specified and/or wherein the exact location user identifier is determined. In some embodiments, this determination can be made by the laser scanning system 310 by identifying the edges of the object and/or user identifier based on light collected by the sensor 314.

After the current location has been specified, the process 600 proceeds to block 608, wherein an estimated motion track is generated. In some embodiments, for example, the user identifier and/or object can be moved through the determined volume 404 and/or the scanning volume 410. In such an embodiment, the tracking of the motion of the object and/or user identifier can facilitate determining the presence of one or more substances on the surface of the object and/or user identifier. In some embodiments, for example, the instantaneous motion of the user identifier and/or object with respect to the laser scanning system 310 can be determined and, based on the instantaneous motion of the object and/or user identifier, a motion track predicting the progress of the object and/or user identifier through the determined volume and/or the scanning volume can be generated. In some embodiments, the generated estimated motion track can be stored in memory associated with the processor 300 and/or the detection system 306. After the estimated motion track has been generated, the process 600 proceeds to block 610 and returns to block 518 of FIG. 5.

Figure 7:
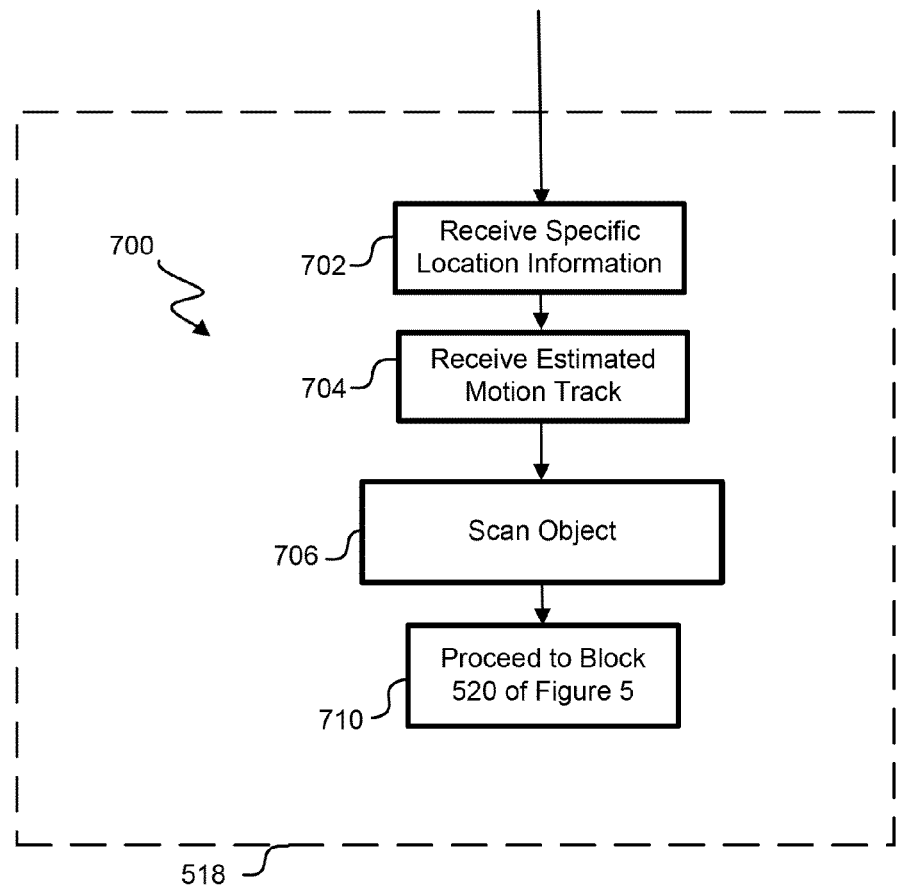
FIG. 7 is a flowchart illustrating one embodiment of a process for focusing scanning.

With reference now to FIG. 7, a flowchart illustrating one embodiment of a process 700 for focusing scanning is shown. In some embodiments, the process 700 can be performed in the place of block 518 of process 500 of FIG. 5. The process 700 begins at block 702 wherein specific location information is received. In some embodiments, the receipt of the specific location information can include the generation of the specific location by a component of the detection system 306 and/or the access point control 208.

After the specific location information has been received, the process 700 proceeds to block 704, wherein the estimated motion track is received. In some embodiments, the receipt of the estimated motion track can comprise the generation of the estimated motion track by a component of the detection system 306 and/or the access point control 208.

After the estimated motion track has been received, the process 700 proceeds to block 706, wherein the object and/or user identifier is scanned. In some embodiments, the scanning of the object can include the illuminator illumination of the object by the illuminator 312. In some embodiments, the illumination of the object can be adjusted over time based on updated specific location information, on the estimated motion track, and/or an adjusted estimated motion track. After the object has been scanned, the process 700 proceeds to block 710 and returns to block 520 of FIG. 5.

Figure 8:
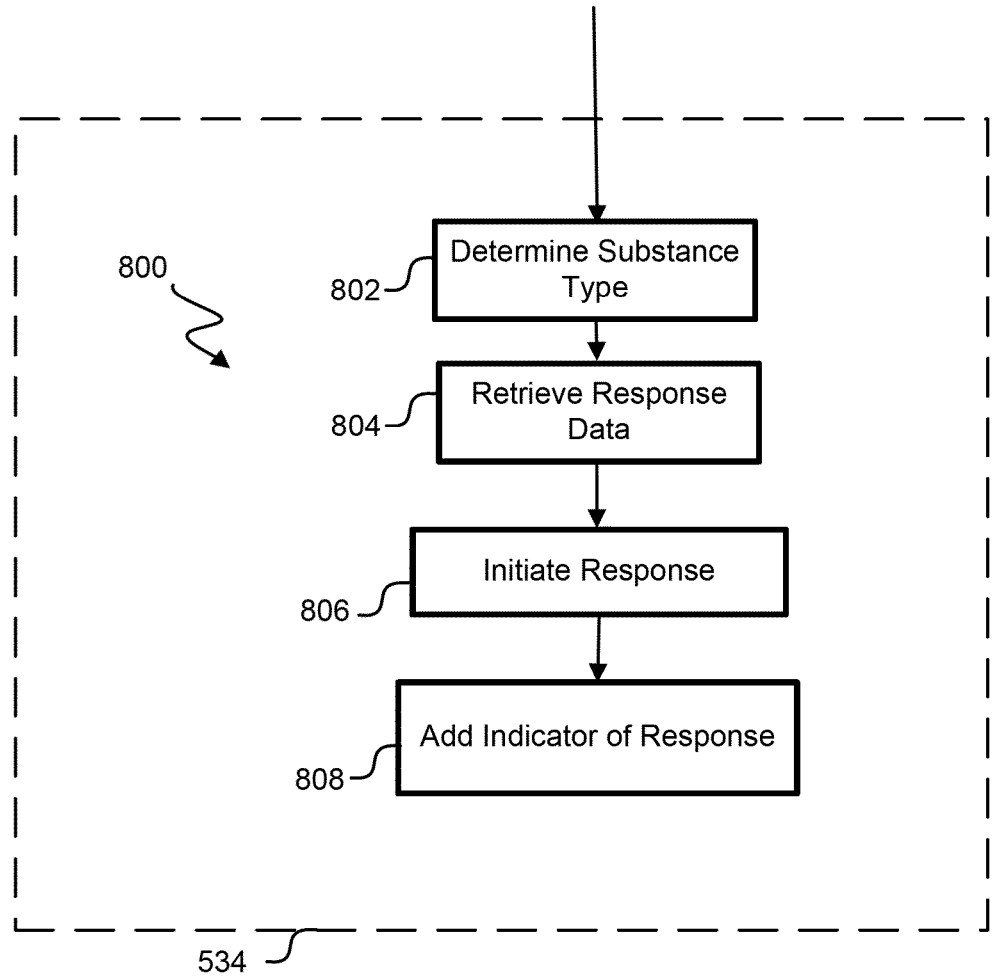
FIG. 8 is a flowchart illustrating one embodiment of a process for adding an indicator of a detected substance.

With reference now to FIG. 8, a flowchart illustrating one embodiment of a process 800 for adding an indicator of a detected substance is shown. In some embodiments, the process 800 can be performed as a sub process of block 534 shown in FIG. 5. The process begins at block 802, wherein a substance type is determined. In some embodiments, the determination of the substance type can include retrieving information from, for example, the substance database 302 identifying a type and/or categorization of the substance identified as present on the surface of the object and/or user identifier. In some embodiments, the substance categorization and/or type can be correlated with a degree of risk, such as public risk, associated with the substance, the degree of illegality associated with the substance, and/or the degree of urgency for responding to the detected substance.

After the substance type has been determined, the process 800 proceeds to block 804 wherein response data is retrieved. In some embodiments, the response data can outline one or several actions that can be performed as a result of the detected substance. In some embodiments, the response data can outline actions ranging from updating data associated with the user identifier and/or object such as a user account and/or an account associated with the user to evacuating an area and/or requesting law enforcement assistance in responding to this detected substance.

After the response data has been retrieved, the process 800 proceeds to block 806 wherein the response is initiated and/or performed. In some embodiments, this can include adding an indicator of the detected substance to the information associated with the user such as, for example, a user account and/or an account associated with user; in some embodiments, this can include the prohibiting of the user to access an area, a good, and/or service, requesting law enforcement assistance and/or notifying law enforcement of the detected substance, transmitting information to a national security and/or intelligence agency including members of the Department of Homeland Security, and/or the like. After the response has been initiated, the process 800 proceeds to block 808 wherein an indicator of the response is added. In some embodiments, this indicator of the response can be added to memory associated with the detection system 306 and/or the access control point 208. In some embodiments, this indicator of the response can be added to the central data store 114, the station data store 216, and/or the substance database 302. In some embodiments, the indicator of the response can be associated with the user, the user account, and/or an account associated with user, and in some embodiments, the indicator of the response can be associated with the user identifier. In some embodiments, the indicator of the response can identify whether the response has been initiated, partially completed, and/or completed. In some embodiments, the indicator of the response can further include information relating to the outcome of the response.

Figure 9:
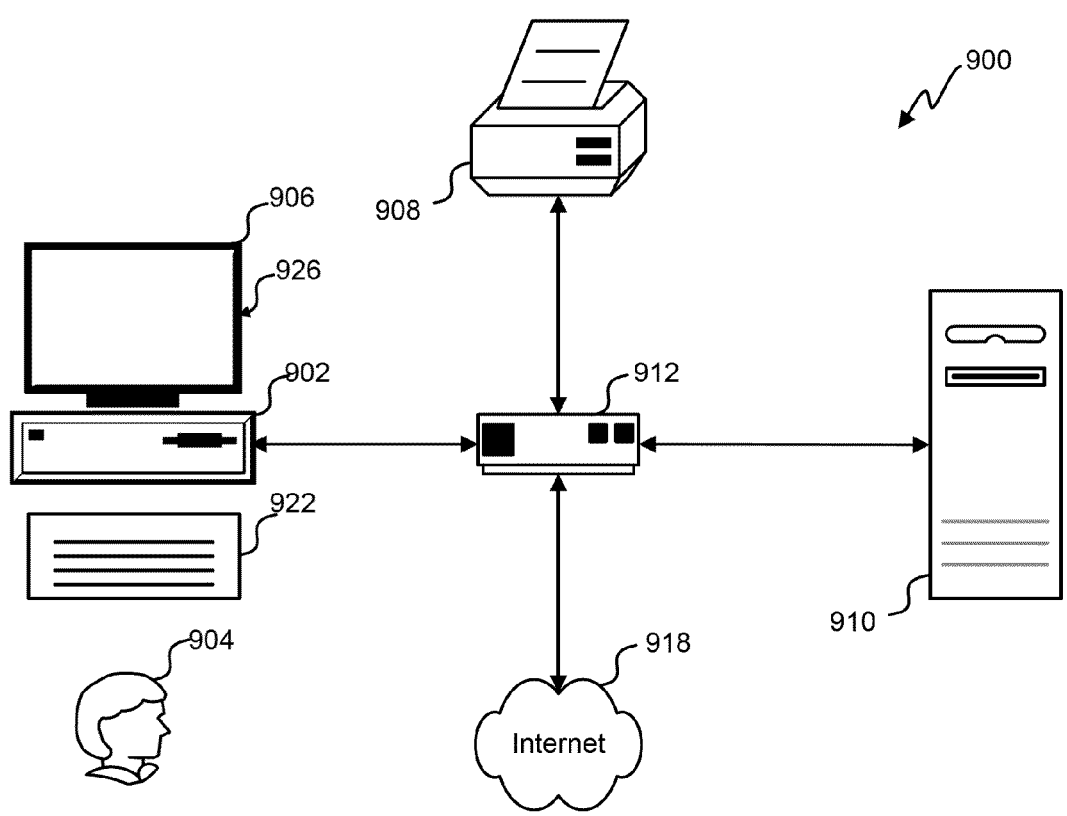
FIG. 9 depicts a block diagram of an embodiment of a computer system.

With reference now to FIG. 9, an exemplary environment with which embodiments may be implemented is shown with a computer system 900 that can be used by a user 904 as a component of the transit system 100. The computer system 900 can include a computer 902, keyboard 922, a network router 912, a printer 908, and a monitor 906. The monitor 906, processor 902 and keyboard 922 are part of a computer system 926, which can be a laptop computer, desktop computer, handheld computer, mainframe computer, etc. The monitor 906 can be a CRT, flat screen, etc.

A user 904 can input commands into the computer 902 using various input devices, such as a mouse, keyboard 922, track ball, touch screen, etc. If the computer system 900 comprises a mainframe, a designer 904 can access the computer 902 using, for example, a terminal or terminal interface. Additionally, the computer system 926 may be connected to a printer 908 and a server 910 using a network router 912, which may connect to the Internet 918 or a WAN.

The server 910 may, for example, be used to store additional software programs and data. In one embodiment, software implementing the systems and methods described herein can be stored on a storage medium in the server 910. Thus, the software can be run from the storage medium in the server 910. In another embodiment, software implementing the systems and methods described herein can be stored on a storage medium in the computer 902. Thus, the software can be run from the storage medium in the computer system 926. Therefore, in this embodiment, the software can be used whether or not computer 902 is connected to network router 912. Printer 908 may be connected directly to computer 902, in which case, the computer system 926 can print whether or not it is connected to network router 912.

Figure 10:
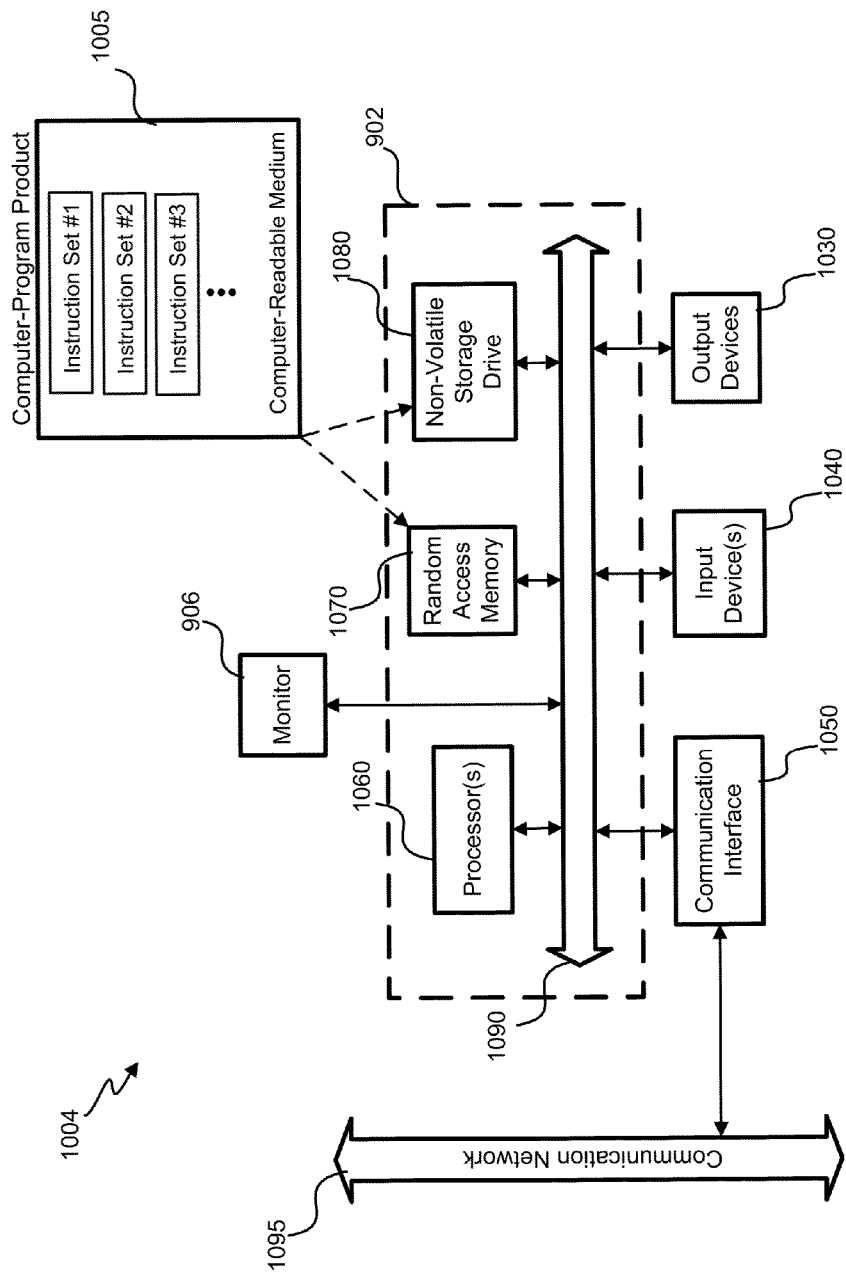
FIG. 10 depicts a block diagram of an embodiment of a special-purpose computer system.

With reference to FIG. 10, an embodiment of a special-purpose computer system 1004 is shown. The above methods may be implemented by computer-program products that direct a computer system to perform the actions of the above-described methods and components. Each such computer-program product may comprise sets of instructions (codes) embodied on a computer-readable medium that direct the processor of a computer system to perform corresponding actions. The instructions may be configured to run in sequential order, or in parallel (such as under different processing threads), or in a combination thereof. After loading the computer-program products on a general purpose computer system 926, it is transformed into the special-purpose computer system 1004.

Special-purpose computer system 1004 comprises a computer 902, a monitor 906 coupled to computer 902, one or more additional user output devices 1030 (optional) coupled to computer 902, one or more user input devices 1040 (e.g., keyboard, mouse, track ball, touch screen) coupled to computer 902, an optional communications interface 1050 coupled to computer 902, and a computer-program product 1005 stored in a tangible computer-readable memory in computer 902. Computer-program product 1005 directs system 1004 to perform the above-described methods. Computer 902 may include one or more processors 1060 that communicate with a number of peripheral devices via a bus subsystem 1090. These peripheral devices may include user output device(s) 1030, user input device(s) 1040, communications interface 1050, and a storage subsystem, such as random access memory (RAM) 1070, which can include static and/or flash memory, and non-volatile storage drive 1080 (e.g., disk drive, optical drive, solid state drive), which are forms of tangible computer-readable memory.

Computer-program product 1005 may be stored in non-volatile storage drive 1080 or another computer-readable medium accessible to computer 902 and loaded into memory 1070. Each processor 1060 may comprise a microprocessor, such as a microprocessor from Intel® or Advanced Micro Devices, Inc.®, or the like. To support computer-program product 1005, the computer 902 runs an operating system that handles the communications of product 1005 with the above-noted components, as well as the communications between the above-noted components in support of the computer-program product 1005. Exemplary operating systems include Windows® or the like from Microsoft® Corporation, Solaris® from Oracle®, LINUX, UNIX, and the like.

User input devices 1040 include all possible types of devices and mechanisms to input information to computer system 902. These may include a keyboard, a keypad, a mouse, a scanner, a digital drawing pad, a touch screen incorporated into the display, audio input devices such as voice recognition systems, microphones, and other types of input devices. In various embodiments, user input devices 1040 are typically embodied as a computer mouse, a trackball, a track pad, a joystick, wireless remote, a drawing tablet, a voice command system. User input devices 1040 typically allow a user to select objects, icons, text and the like that appear on the monitor 906 via a command such as a click of a button or the like. User output devices 1030 include all possible types of devices and mechanisms to output information from computer 902. These may include a display (e.g., monitor 906), printers, non-visual displays such as audio output devices, etc.

Communications interface 1050 provides an interface to other communication networks 1095 and devices and may serve as an interface to receive data from and transmit data to other systems, WANs and/or the Internet 918. Embodiments of communications interface 1050 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1050 may be coupled to a computer network, to a FireWire® bus, or the like. In other embodiments, communications interface 1050 may be physically integrated on the motherboard of computer 902, and/or may be a software program, or the like.

RAM 1070 and non-volatile storage drive 1080 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1070 and non-volatile storage drive 1080 may be configured to store the basic programming and data constructs that provide the functionality of various embodiments of the present invention, as described above.

Software instruction sets that provide the functionality of the present invention may be stored in RAM 1070 and non-volatile storage drive 1080. These instruction sets or code may be executed by the processor(s) 1060. RAM 1070 and non-volatile storage drive 1080 may also provide a repository to store data and data structures used in accordance with the present invention. RAM 1070 and non-volatile storage drive 1080 may include a number of memories including a main random access memory (RAM) to store of instructions and data during program execution and a read-only memory (ROM) in which fixed instructions are stored. RAM 1070 and non-volatile storage drive 1080 may include a file storage subsystem providing persistent (non-volatile) storage of program and/or data files. RAM 1070 and non-volatile storage drive 1080 may also include removable storage systems, such as removable flash memory.

Bus subsystem 1090 provides a mechanism to allow the various components and subsystems of computer 902 communicate with each other as intended. Although bus subsystem 1090 is shown schematically as a single bus, alternative embodiments of the bus subsystem may utilize multiple busses or communication paths within the computer 902.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of focusing a laser beam to a receiver region, the method comprising:
    providing an RFID receiver configured to receive an initialization event information containing signal relating to an RFID device when the RFID device is within a detectable distance from the RFID receiver, wherein the detectable distance from the RFID receiver defines an RFID scanning region;
    positioning a laser scanning system a known distance from the RFID receiver such that the laser scanning system can scan the RFID scanning region;
    determining the RFID device's distance from said receiver based on the received initialization event information containing signal relating to the RFID device;
    logging a transaction associated with the RFID device;
    activating the laser scanning system, wherein the laser scanning system comprises a laser and a light detector;
    scanning the RFID scanning region with the laser scanning system, wherein the scanning comprises illuminating the RFID scanning region with the laser;
    detecting a spectral property of the illumination reflected from a surface of the RFID device;
    generating a value representing the spectral property of the illumination reflected from the surface of the RFID device; and
    identifying a type of substance on a surface of the RFID device by the spectral property of the illumination reflected from the surface, the spectral property comprising magnitude and frequency of the illumination reflected.

2. The method of claim 1, wherein the RFID receiver comprises an antenna emanating radio signals configured to initiate communication with the RFID device when the RFID device is within the detectable distance from the RFID receiver.

3. The method of claim 1, wherein the initialization event information relating to the RFID device is received by the RFID receiver via a signal generated by the RFID receiver and reciprocated by the RFID device.

4. The method of claim 3, wherein the position of the RFID device with respect to the scanning system is determined via the strength of the signal received by the RFID receiver.

5. The method of claim 1, wherein a property of the laser is changed based on the position of the RFID device with respect to the scanning system as determined by the received initialization event information relating to the RFID device.

6. The method of claim 1, wherein the laser outputs light having multiple frequencies.

7. The method of claim 6, wherein the laser comprises an array of lasers having different frequencies.

8. The method of claim 6, wherein the laser outputs light of variable frequencies.

9. The method of claim 1, wherein the laser scanning system is configured to identify the region within the edges of the RFID device that has entered within the detectable distance from the RFID receiver and focus on the portion of the laser scanning region occupied by the RFID device.

10. The method of claim 1, wherein receiving information from the device comprises receiving an identifier uniquely associated with an account.

11. The method of claim 1, wherein the laser scanning system is activated in response to the logging of the transaction associated with the RFID device.

12. The method of claim 1, wherein the volume scanned by the laser scanning system defines a cone.

13. The method of claim 1, wherein identifying a type of substance on the surface of the RFID device by the spectral property of the illumination reflected from the surface comprises:
    identifying a region of interest of the RFID device based on the detected spectral property of the illumination reflected from the surface;
    focusing the laser on the region of interest of the RFID device;

detecting a spectral property of the illumination reflected from the surface of the region of interest of the RFID device; and comparing the spectral property of the illumination reflected from the surface of the region of interest of the RFID device to a stored spectral property of at least one type of substance.

14. The method of claim 13, wherein the laser is focused on the region of interest of the RFID device as the RFID device is moved through the RFID scanning region.

15. The method of claim 1, wherein the light detector comprises a detector array.

16. A system for detection of a type of substance on the surface of an object, the system comprising:
  a scanner comprising an RFID receiver, wherein the RFID receiver is configured to:
    receive an initialization event information containing signal relating to an RFID device when the RFID device is within a detectable distance from the RFID receiver, wherein the detectable distance from the RFID receiver defines an RFID scanning region; and
    determine the RFID device's distance from said receiver based on the received initialization event information containing signal relating to the RFID device;
  a laser scanning system, wherein the laser scanning system comprises a laser configured to illuminate the RFID scanning region, wherein the laser scanning system comprises a light detector configured to detect a spectral property of the illumination reflected from a surface of the RFID device within the RFID scanning region, wherein the laser scanning system is positioned a known distance from the RFID receiver such that the laser scanning system can scan the RFID scanning region; and
  a processor configured to:
    log a transaction associated with the RFID device;
    activate the laser scanning system;
    direct the scanning of the RFID scanning region with the laser scanning system, wherein the scanning comprises illuminating the RFID scanning region with the laser;

receive spectral property data of the illumination reflected from the surface of the RFID device;
generate a value representing the spectral property data of the illumination reflected from the surface of the RFID device; and
identify a type of substance on a surface of the RFID device by the spectral property data of the illumination reflected from the surface of the RFID device, the spectral property data comprising magnitude and frequency of the illumination reflected.

17. The system of claim 16, wherein a property of the laser is changed based on the position of the RFID device with respect to the scanning system as determined by the received initialization event information relating to the RFID device.

18. The system of claim 16, wherein the laser scanning system is configured to identify the region within the edges of the RFID device that has entered within the detectable distance from the RFID receiver and focus on the portion of the laser scanning region occupied by the RFID device.

19. The system of claim 16, wherein the laser scanning system is activated in response to the logging of the transaction associated with the RFID device.

20. The system of claim 16, wherein the processor is configured to identify a type of substance on the surface of the RFID device by the spectral property data of the illumination reflected from the surface by:
  identifying a region of interest of the RFID device based on the detected spectral property data of the illumination reflected from the surface;
  directing the laser to focus on the region of interest of the RFID device;
  receiving spectral property data of the illumination reflected from the surface for the region of interest of the RFID device; and
  comparing the spectral property data of the illumination reflected from the surface for the region of interest of the RFID device to a stored spectral property data of at least one type of substance.

* * * * *